United States Patent

[11] 3,604,916

| [72] | Inventors | Tarek Adra<br>La Canada;<br>Robert P. Draper, Burbank, both of, Calif. |
|---|---|---|
| [21] | Appl. No. | 767,638 |
| [22] | Filed | Oct. 15, 1968 |
| [45] | Patented | Sept. 14, 1971 |
| [73] | Assignee | Harvey Hubbell Incorporated<br>Bridgeport, Conn. |

[54] FLOODLIGHT-MOUNTING ARRANGEMENT
6 Claims, 4 Drawing Figs.

[52] U.S. Cl. .................................................. 240/3,
240/41.6
[51] Int. Cl. ..................................................... F21p 5/00
[50] Field of Search ........................................... 240/3, 41.6

[56] References Cited
UNITED STATES PATENTS
1,959,044  5/1934  Wallace........................ 352/216 X
2,587,917  3/1952  Stone ........................... 240/3 X
3,213,270  10/1965  Appleton et al. ............. 240/3
3,254,205  5/1966  Cobb............................. 240/3

Primary Examiner—Samuel S. Matthews
Assistant Examiner—Richard M. Sheer
Attorney—Wooster, Davis & Cifelli ABSTRACT: A vertically adjustable floodlight-mounting device including first and second cooperating swivel joint elements is mounted on a horizontally adjustable support and is supportingly secured to the housing of a floodlight to permit the later to be selectively adjusted in a vertical plane. An adjustable mounting plate securing the mounting device to the floodlight housing, permits the housing to be selectively moved relative to the mounting device to thereby alter the relationship between the longitudinal axis of the floodlight and the fixed rotation axis of the swivel joint elements.

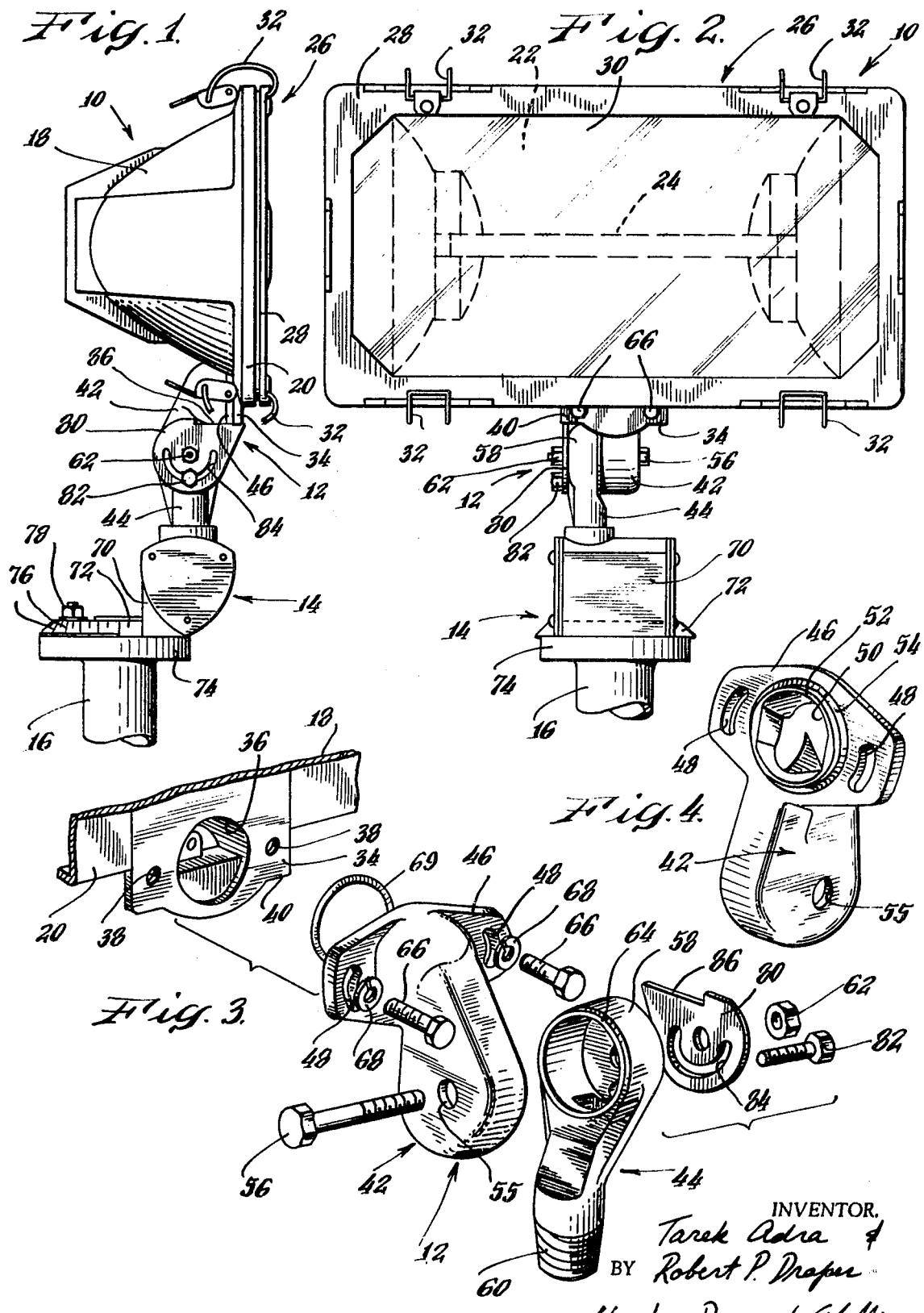

FLOODLIGHT-MOUNTING ARRANGEMENT

BACKGROUND OF THE INVENTION

This invention relates to an improved floodlight and, more particularly, to a mounting arrangement which will allow the floodlight to be adjusted to maintain the floodlamp in a horizontal position.

It is common practice to provide floodlights with adjustment means which allow the beam of light to be selectively directed in plural vertical positions about a horizontal axis, and adjustment means which allow the beam of light to be selectively directed to plural positions about a vertical axis.

The conventional vertical adjusting means are of many types; however, they are usually structurally complicated and include substantial hardware. One type includes mounting trunnions located at opposite ends of the floodlight housing to which yoke arms may be pivotally secured. A locking mechanism is formed on one of the trunnions to maintain the floodlight in a desired angular position.

Another well-known type of vertical adjusting means usually used with smaller lightweight floodlights comprises a two-part swivel support. One element of the support is stationarily mounted while the other element is mounted upon the floodlight housing, usually at the rear of the housing upon the axis of beam rotation. The swivel joint elements generally include relatively rotatable mating surfaces each provided with interengaging teeth which prevent relative movement between the elements once a securing capscrew is tightened. Due to the usual placement of the swivel support the force moment on the toothed joint is at a maximum. Thus, it becomes necessary to utilize large, heavy-duty swivel elements which, of course, are expensive.

Floodlight manufacturers are always looking to increase the amount of illumination from a floodlight of a given size. This search often leads to improved floodlamps such as those of the tungsten-halogen type. The manufacturers of this type of floodlamp specify that it should be operated in a horizontal position with a tolerance of plus or minus only 4° from horizontal. It should be apparent that when mounting this type of floodlamp in the usual floodlight housing mounting arrangements which may be adjustable in only two directions, as described above, it is probable that the floodlamp will be oriented in a burning position not conforming to the lamp manufacturer's limitation. This is so since the "vertical" standards upon which the floodlights are usually mounted are often nonvertical. Therefore, to correct the burning position of this type of floodlamp in the conventional floodlights the user is required to demount and shim either the floodlight housing or the entire mounting means upon the standard.

SUMMARY OF THE INVENTION

Accordingly it is the primary object of this invention to provide a simple floodlight-mounting arrangement of the swivel-type which may be selectively vertically adjusted and which will allow the floodlamp to be accurately horizontally positioned.

Another object of this invention is to provide a floodlight-mounting arrangement as described in the above paragraph which may be positioned at the underside of the floodlight housing, being located so that the clockwise and counter-clockwise force moments about the swivel joint are substantially equal when the floodlight is in a central position.

A further object of this invention is to provide a swivel joint type floodlight-mounting arrangement whose elements are hollow for passage of the electrical power cord therethrough and into the floodlight housing, including a simple and effective watertight sealing means to prevent leakage into the housing.

To accomplish these objects, in one form an improved floodlight-mounting arrangement is provided which comprises: a floodlight housing; means within the housing defining the axis of a longitudinal floodlamp; mounting means on the housing; selectively adjustable swivel means secured to the mounting means to aim the housing in various directions in a vertical plane; and selectively adjustable mounting means on the swivel means to allow the axis of the floodlamp to be moved relative to the axis of the swivel means.

BRIEF DESCRIPTION OF THE DRAWING

Other objects and further details of that which is novel and the invention herein will be clear from the following description and claims taken with the accompanying drawing wherein:

FIG. 1 is a side elevational view of a floodlight and its adjustable mounting arrangement;

FIG. 2 is a front elevational view thereof;

FIG. 3 is an exploded perspective view of the novel swivel joint mounting arrangement looking toward the left side of FIG. 1; and FIG. 4 is a perspective view of the movable element of the swivel joint taken in the direction of the sealing face thereof.

DESCRIPTION OF THE PREFERRED EMBODIMENT

Turning now to the drawing, there is illustrated in FIGS. 1 and 2 a floodlight 10 supported by the novel vertically adjustable swivel joint mounting arrangement 12 which is secured upon a usual horizontally adjustable mounting device 14 atop a vertical standard 16.

The floodlight 10 includes a trough-shaped cast housing 18 open at one end and defining a peripheral flange 20 at its open end. The housing is preferably made of aluminum or other suitable material which has the desirable characteristics of strength and light weight. A reflector 22 and a floodlamp 24 are mounted in a known manner within the trough-shaped housing. The floodlamp is preferably of the tungsten-halogen type.

Cover unit 26 which closes the open end of the housing comprises a frame 28 carrying therein a transparent lens 30, made of heat and shock resistant glass or some suitable plastic material, and several overcenter locking clamps 32. By manipulating the locking clamps in a known manner the cover unit 26 may be quickly snapped upon and removed from the open face of the housing 18 with the frame 28 abutting the peripheral flange 20.

A mounting seat 34 which may be formed integrally with the floodlight housing 18 is located on the rear side of the flange 20 below the trough-shaped housing (note FIG. 1) approximately at the center thereof as viewed in FIG. 2. The mounting seat has a planar face and defines at its rear a large central opening 36 therein which communicates with the interior of the floodlight housing, through which an electrical current carrying supply cord may pass. Tapped mounting bores 38 are defined on either side of the opening 36 and a usual memory stop 40 is located at the lower edge of the mounting seat.

The swivel joint mounting arrangement 12 comprises a first element 42 and a second element 44 both of which are hollow for passage of an electrical supply cord. The first element 42 has a face plate 46 with arcuate slots 48 defined therein. With reference to FIG. 4 there is illustrated the mating face of the plate 46 which has a central opening 50 communicating to the interior of the element. A lip 52 surrounds the opening and a sealing groove 54 encircles the lip 52. At the opposite end of the first element there is an opening 55 for a usual pivot capscrew 56.

The second swivel joint element 44 comprises a usual knuckle having a bell 58 at its upper end and a pipe threaded portion 60 at its lower end. The elements 42 and 44 join in the usual manner, being secured together by means of the pivot capscrew 56 and nut 62. It should be noted that mating teeth need not be formed upon these elements on their mating surfaces, the second element 44 merely having a lip 64 which enters a receiving opening (not shown) defined in the first element 42. This mating arrangement is usually sufficient since the pivot axis of the vertically adjustable swivel joint mounting arrangement 12 has been positioned approximately below the center of gravity of the floodlight housing, when the floodlight beam is directed horizontally, thereby substantially equalizing the clockwise and counterclockwise force moments on the mating swivel joint surfaces in this central position.

The swivel joint mounting arrangement 12 is secured to the floodlight housing 10 upon the mounting seat 34 by means of securing screws 66 having lockwashers 68 which pass through the arcuate slots 48 and are threadedly engaged in the tapped bores 38. A sealing O-ring 69 is seated in the sealing groove 54 and is urged against the face of the mounting sea 34 when the securing screws are tightened. It should be noted that this is an extremely simple and inexpensive sealing arrangement for preventing water leakage into the interior of the floodlight housing 18. This is also made possible due to the positioning of the swivel joint mounting arrangement below the trough portion of the floodlight housing which protects the seal from precipitation.

The pipe thread portion 60 of the second swivel element 44 is threadedly engaged into a pipe tapped opening defined in the upper end of the cable housing portion 70 of the usual horizontally adjustable mounting device 14 (note FIGS. 1 and 2). This device further includes a horizontal adjusting plate 72 which is supported for rotation, upon a pivot pin (not shown), atop the standard 16 on mounting flange 74. Indicia 76 which are inscribed on the adjusting plate 72 cooperate with a fixed mark on the mounting flange 74 to indicate the angular position of the floodlight. A locking bolt 78 passes through a usual slot in the adjusting plate and is threadedly engaged in the mounting flange 74 so that the horizontally adjustable mounting device 14 may be locked in a selectively determined angular position.

After aiming the floodlight 10 in the proper vertical direction, a usual memory stop plate 80 which is normally pivotable about the capscrew 56 is made immovable relative to the second swivel joint element 44 by means of a memory stop locking screw 82 which passes through an arcuate slot 84 in the stop plate 80 and is threadedly engaged in a tapped opening (not shown) in the second swivel joint element 44. A flat cam surface 86 on the stop plate 80 cooperates with the memory stop 40 of the floodlight housing to ensure that when the floodlight housing has once been properly and accurately aimed it will be returned to this position after it is removed therefrom for servicing or repair.

Once the floodlight has been set up and the vertical and horizontal adjustments have been made through the respective adjustments have been made through the respective adjusting devices 12 and 14 it is necessary to determine whether the floodlamp 24 is horizontal. This may be accomplished in a known manner with a spirit level. If the floodlamp is of the tungsten-halogen type and if its mounting position deviates from the manufacturer's recommended tolerances, the securing screws 66 may be loosened and the floodlight housing 10 may be shifted so that screws 66 move in the arcuate slots 48 and the axis of the floodlamp 10 is adjusted relative to the fixed axis of the swivel joint 12. When the spirit level indicates that the floodlamp is properly positioned the securing screws 66 may be tightened. This simple procedure eliminates the costly process of demounting, shimming, and remounting the floodlight.

It should be understood that the locking force exerted by the pivot capscrew 56 and nut 62, securing the swivel joint elements 42 and 44 together, need not be very great due to the positioning of the swivel joint substantially beneath the center of gravity of the floodlight housing 10. This mounting position also gives a beam are resistance to loosening and shift well in excess of the conventional "on axis" toothed swivel joint mounting means which lack a satisfactory mechanical advantage. Further, this mounting position assists in providing a watertight seal between the swivel joint and the floodlight housing when a simple O-ring sealing element 69 is used.

It should be understood that the present disclosure has been made by way of example and that numerous changes in details of construction and the combination and arrangement of parts may be resorted to without departing from the true spirit and the scope of the invention as hereinafter claimed.

We claim:

1. An improved floodlight-mounting arrangement comprising: a floodlight housing; a longitudinal floodlamp within said housing; longitudinally extending mounting means on said housing parallel to said floodlamp; selectively adjustable swivel means secured to said mounting means and pivotable about a fixed rotation axis parallel to said floodlamp and below the center of gravity of said housing in substantial vertical alignment therewith when said floodlight is in use to aim said housing in various directions in a vertical plane; memory means adjustably positioned on said swivel means for engaging a lower edge of said housing mounting means to maintain said housing in the desired direction in the vertical plane; and selectively adjustable mounting means on said swivel means to mount said housing on said swivel means and to permit selective adjustment of the floodlamp about a horizontally extending axis perpendicular to said floodlamp, said selectively adjustable mounting means including a mounting plate defining laterally spaced arcuate slots therethrough and fastening means extending through said slots and engaging laterally spaced points on said housing mounting means for securing said housing to said swivel means and forming laterally spaced pivot points about which the floodlamp is selectively adjusted.

2. The improved floodlight mounting arrangement defined in claim 1 wherein said swivel means includes a first swivel element, a second swivel element, and pivot means securing said first and second swivel elements to one another for relative rotation, said pivot means comprising a screw and nut which may be tightened to maintain said swivel means in a selectively determined position.

3. The improved floodlight mounting arrangement defined in claim 2 wherein: said first swivel element includes said mounting plate, said first swivel element being hollow to pass electrical power supply wires and defining an opening in said mounting plate; and said mounting means on said housing includes a planar member defining an opening therein communicating with the interior of said floodlight housing, whereby when said swivel means is secured to said mounting means, said mounting plate and said planar member are adjacent one another and the openings defined in each are in alignment.

4. The improved floodlight-mounting arrangement defined in claim 3 wherein: a sealing groove surrounds said opening in said mounting plate; and a resilient O-ring is positioned in said sealing groove to form a seal between said swivel means and said mounting means.

5. The improved floodlight-mounting arrangement defined in claim 3 wherein a lip surrounds said opening in said mounting plate and extends outwardly from said mounting plate to be inserted in said opening in said planar member when said swivel means is secured to said mounting means.

6. The improved floodlight-mounting arrangement defined in claim 5 wherein: a sealing groove surrounds said lip; and a resilient O-ring is positioned in said sealing groove to form a seal between said swivel means and said mounting means.